Figure 1:
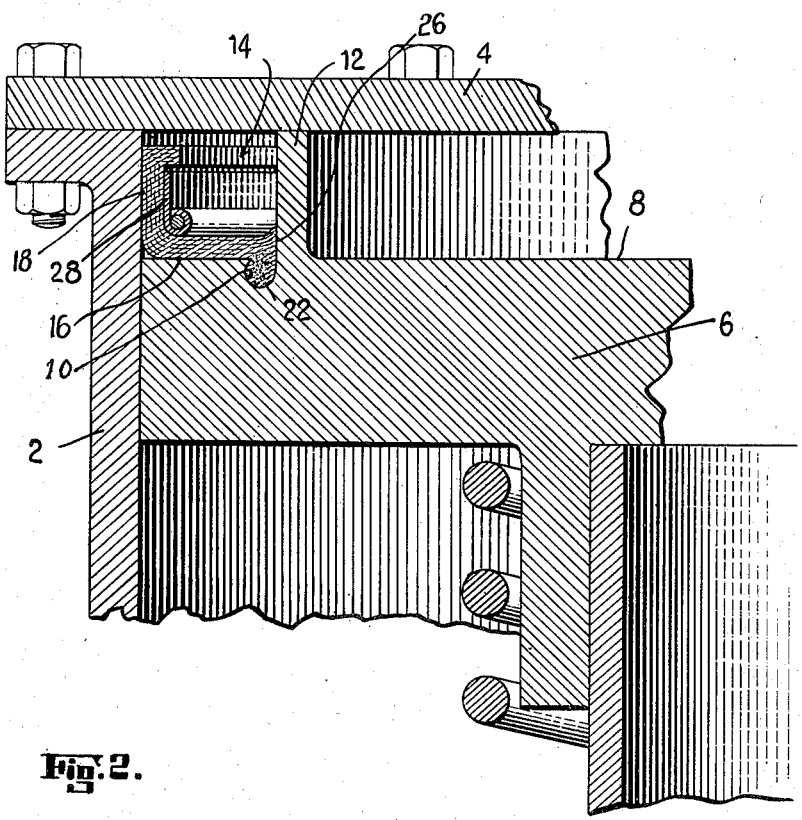

Nov. 12, 1940.         G. CHRISTENSON         2,220,993
PISTON PACKING
Filed July 21, 1937

INVENTOR.
George Christenson
BY Virgil C. Kline
ATTORNEY.

Patented Nov. 12, 1940

2,220,993

UNITED STATES PATENT OFFICE 2,220,993

PISTON PACKING

George Christenson, Plainfield, N. J., assignor to Johns-Manville Corporation, New York, N. Y., a corporation of New York Application July 21, 1937, Serial No. 154,865

6 Claims. (Cl. 309—33)

This invention relates to cylinder and piston assemblies. More specifically it relates to a packing which is capable of providing an efficient seal between a piston and the walls of the cylinder within which it moves.

One object of this invention is to provide a packing which is capable of maintaining a fluid tight seal between a piston and its cooperative cylinder at all times, and under all conditions of operation to which a piston and cylinder assembly is subjected.

A further object of this invention is to provide a packing for a piston and cylinder assembly which can be initially installed and replaced by removing a minimum of parts from the assembly.

Other objects and advantages, if not specifically pointed out, will be apparent to those skilled in the art from the following detailed description of what is now considered to be the preferred embodiment of the invention.

Figure 2:
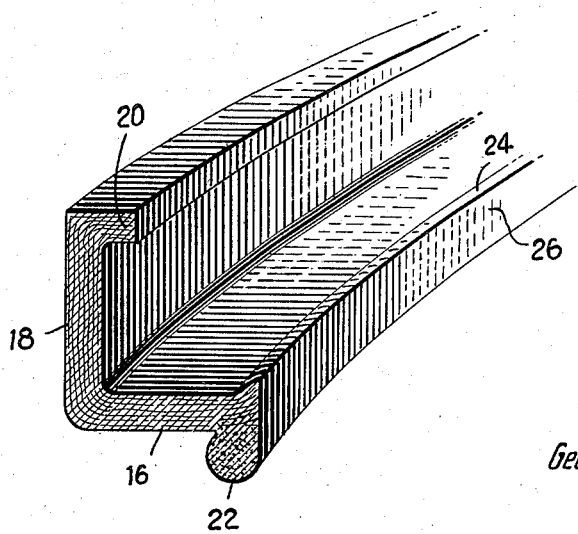

In the drawing:

Fig. 1 is a fragmentary, vertical, central sectional view of a piston and cylinder assembly embodying the present invention, and Fig. 2 is a fragmentary perspective view of the packing cup of the present invention.

This invention is capable of being applied to many different types of machines or apparatuses which involve a piston and cylinder assembly, and is not limited to any specific application. It has been found, however, that this invention is particularly applicable to air brake assemblies, and power reverse gear assemblies for steam locomotives. For the purpose of explanation, it has been illustrated and described as applied to a single acting piston of the type commonly employed in air brake assemblies, but it is to be understood that it is equally applicable to a double acting piston, such as that usually employed in a power reverse gear assembly.

Referring to Fig. 1, a cylinder 2 is shown which has a cylinder head 4 connected thereto in any suitable manner.

A piston 6 is reciprocable within the cylinder 2 and has a face 8 provided with a groove 10 which is substantially annular in shape, and is wider in cross section within the cylinder head 6 than at the face 8 for a reason which will be later described.

An annular flange 12 projects from the piston face 8 towards the cylinder head 4.

A packing 14 is disposed on the piston face 8 between the cylinder wall and the flange 12. The packing 14 (see Fig. 2) comprises a base 16 to which an upturned portion 18 is connected.

The upturned portion will usually take the form of a lip or flange and is provided with an inwardly projecting shoulder 20, and the base 16 has a bead 22 formed thereon.

The base 16 and the upturned portion or flange 18 may be formed of laminated fabric suitably impregnated or frictioned with a material, such as a rubber composition. The bead 22 is yieldable and may be formed of the same composition as the impregnating material but preferably without reinforcing fabric. The bead 22 may, if desired, be formed from a different material than the remainder of the packing, but in its preferred construction it is formed as previously described. The base 16 is extended upwardly along its inner margin as shown at 24. The bead 22 has a bulbous cross-sectional shape and is generally shaped to fit within the groove 10 in the piston head 6. The bead 22 may be formed with other cross-sectional shapes if desired, the only requirement being that it flare or become wider at a point spaced from the base 16 than at its point of connection with the base 16. The upturned portion 24 of the base 16, the inner edge of the base 16, and the inner wall of the bead 22 form a wall surface 26 of substantial width which assists in securing the packing in position during operation.

The packing 14 is applied to the piston 6 by removing the cylinder head 4, except in original installations when the packing will be applied before the head 4 is connected to the cylinder 2, and sliding it over the flange 12 and forcing the bead 22 down into the groove 10 to substantially fill the groove and thereby lock the packing 14 to the piston head 6, as well as provide an efficient fluid seal between the packing and piston head.

An expander ring 28 of a conventional type may be snapped into position around the inside of the packing flange 18, and is prevented from slipping off of the packing by the shoulder 20.

The packing structure previously described is maintained in fluid sealing contact with the piston 8 at all times, and there is no tendency for the packing to float away from the piston head 6 when the piston is moved by fluid pressure within the cylinder acting against the piston head 8. This packing construction also accomplishes the foregoing without the aid of a follower plate or any similar device, or any mechanism for clamping the packing to the piston head. All of these features reduce the cost of manufacturing the piston and cylinder assembly in the first instance, and also reduce the expense of maintenance because of the rapidity with which a packing can be replaced.

The flange 18 of the packing does not extend toward the cylinder head 4 to any greater degree than the flange 12; thereby enabling the flange 12 to contact with the cylinder head 4 and prevent crushing of the packing flange 18 between the piston 6 and cylinder head 4.

The foregoing details have been given for the purpose of illustration and not limitation, since many changes may be made in the physical embodiment of the invention herein disclosed without departing from the spirit of the invention. For example, the groove 10 may be made discontinuous and the bead 22 likewise made discontinuous to correspond to the groove 10. Also, the bead 22 may be placed at other points along the base 16 than at the position shown, if a particular installation should make such a change desirable.

What I claim is:

1. In combination with a cylinder, a head therefor, a piston reciprocable within the cylinder and having a face provided with a continuous groove therein, the groove being wider within the piston than at the face thereof, an annular projection affixed to said piston providing a continuous flange extending from the face of said piston toward the cylinder head, and a packing cup comprising a base in contact with the piston face and the flange, a portion in contact with the cylinder wall and extending toward the cylinder head to no greater degree than the flange, said base and said portion comprising impregnated fabric, and a bead seated within and substantially filling said groove to prevent relative movement between the piston and packing cup and to provide a fluid seal between the same, said bead being composed of a readily yieldable, deformable composition.

2. A packing cup for assembly with a reciprocable piston having a forward face, an annular wall projecting from said face, and an annular groove in said face adjacent said wall, said groove being of greatest width at a point remote from said face, said packing cup comprising a base, a deformable bead formed of plastic material extending from the plane of said base at the inner periphery thereof and shaped and arranged for yieldable interlocking engagement with said groove, and a continuous upstanding peripheral lip formed integrally with said base and adapted for sliding and sealing engagement with a cylinder wall, said base and lip comprising a laminated fabric material carrying a rubber-like impregnant.

3. A packing cup for assembly with a reciprocable piston having a forward face and an annular groove therein, said packing cup comprising a base, a bead extending from the plane of said base and shaped and arranged for yieldable interlocking engagement with said groove, said bead being composed of a yieldable rubber-like material, and a continuous upstanding peripheral lip formed integrally with said base and adapted for sliding and sealing engagement with the cylinder wall, said base and lip comprising a laminated fabric material carrying a rubber-like impregnant.

4. In combination a cylinder, a head therefor, a piston reciprocable within said cylinder and having a forward face with an annular groove therein of greatest width at a point remote from said face, a packing cup carried wholly by said piston for reciprocation therewith, said packing cup comprising a base in contact with the piston face and including a bead composed of a readily deformable material and substantially complemental in shape to said groove and seated therein, a peripheral projecting lip formed integrally with said base and in sealing engagement with said cylinder wall, said base and lip comprising fabric carrying a rubber-like impregnant, means for maintaining said lip in said sealing engagement, and a member projecting from the face of said piston to an extent sufficient to prevent crushing of said upstanding lip against said cylinder head in any forward movement of said piston.

5. A packing cup for assembly with a reciprocable piston having a forward face and an annular groove therein, said packing cup comprising an annular base and a bead composed of a readily deformable, plastice composition integral with said base and extending from the plane thereof and shaped and arranged for yieldable, interlocking engagement with said groove, and an upstanding annular lip carried by said base at its outer periphery and adapted for sliding and sealing engagement with the cylinder wall, said base and lip comprising an impregnated fabric.

6. In combination a cylinder, a piston reciprocable within said cylinder and having a forward face, an annular wall projecting from said face and an annular groove in said face adjacent said wall and defining a continuation thereof, and a packing cup carried by said piston for reciprocation therewith, said packing cup comprising an annular base in contact with the piston face with its inner periphery pressed against said annular wall, and a bead composed of a readily deformable, yieldable composition integral with said base and extending from the plane thereof and seated within said groove, the bead and groove being shaped for wedging, interlocking and sealing engagement, and a peripheral upstanding lip formed integrally with said base and in seating engagement with a wall of the cylinder, said base and lip comprising fabric carrying a rubber-like impregnant.

GEORGE CHRISTENSON.